United States Patent
Koo et al.

(10) Patent No.: US 7,218,619 B2
(45) Date of Patent: May 15, 2007

(54) CALL ADMISSION METHOD IN CDMA MOBILE COMMUNICATION SYSTEM

(75) Inventors: Chang-Hoi Koo, Songnam-shi (KR); Kyou-Woong Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 927 days.

(21) Appl. No.: 09/908,170

(22) Filed: Jul. 18, 2001

(65) Prior Publication Data
US 2002/0110106 A1   Aug. 15, 2002

(30) Foreign Application Priority Data
Jul. 18, 2000   (KR) ............................. 2000-41127

(51) Int. Cl.
*H04Q 7/00* (2006.01)
*H04B 7/204* (2006.01)
(52) U.S. Cl. ................... 370/329; 370/342; 455/450
(58) Field of Classification Search .............. None
See application file for complete search history.

(56) References Cited

U.S. PATENT DOCUMENTS

| | | | |
|---|---|---|---|
| 5,287,552 A * | 2/1994 | Sasuta et al. ............... 455/518 |
| 5,852,780 A * | 12/1998 | Wang et al. ................. 455/450 |
| 5,903,851 A * | 5/1999 | Backstrom et al. .......... 455/557 |
| 5,940,763 A * | 8/1999 | Alperovich et al. ......... 455/450 |
| 6,055,437 A * | 4/2000 | Riley et al. .................. 455/511 |
| 6,061,559 A * | 5/2000 | Eriksson et al. .......... 455/435.3 |
| 6,069,882 A * | 5/2000 | Zellner et al. ............... 370/329 |
| 6,240,079 B1* | 5/2001 | Hamalainen et al. ........ 370/337 |
| 6,400,954 B1* | 6/2002 | Khan et al. .................. 455/450 |
| 6,532,227 B1* | 3/2003 | Leppisaari et al. .......... 370/348 |
| 6,571,102 B1* | 5/2003 | Hogberg et al. ............. 455/450 |
| 6,718,171 B1* | 4/2004 | Hunzinger ................... 455/450 |
| 6,754,498 B2* | 6/2004 | Chun et al. .................. 455/442 |
| 6,766,173 B1* | 7/2004 | Chun et al. .................. 455/450 |
| 6,804,520 B1* | 10/2004 | Johansson et al. ........... 455/450 |
| 6,816,500 B1* | 11/2004 | Mannette et al. ............ 370/431 |
| 6,889,048 B1* | 5/2005 | Koo ......................... 455/452.1 |

* cited by examiner

*Primary Examiner*—Chau Nguyen
*Assistant Examiner*—Jordan Hamann
(74) *Attorney, Agent, or Firm*—The Farrell Law Firm

(57) ABSTRACT

A call admission method considering call characteristics and the service level of a subscriber terminal in a CDMA mobile communication system is provided. When a new call is requested in a situation where it cannot be admitted, a call being serviced with a lower service level than the new call is held for admission of the new call. If the held service can be resumed under some circumstances, it is resumed.

17 Claims, 3 Drawing Sheets

CALL ADMISSION METHOD IN CDMA MOBILE COMMUNICATION SYSTEM

PRIORITY

This application claims priority to an application entitled "Call Admission Method in CDMA Mobile Communication System" filed in the Korean Industrial Property Office on Jul. 18, 2000 and assigned Serial No. 2000-41127, the contents of which are hereby incorporated by reference.

BACKGROUND OF THE INVENTION

1. Field of the Invention

The present invention relates generally to a call admission method in a CDMA mobile communication system, and in particular, to a call admission method considering call characteristics and the service class of a subscriber terminal.

2. Description of the Related Art

Today's rapid growth in the mobile communication industry increases the demand for a mobile communication system that is capable of providing multimedia services including transmission of data and pictures as well as typical voice services. This mobile communication system is called the future mobile communication system. This future mobile communication system generally operates in CDMA (Code Division Multiple Access). The CDMA systems are deployed in a synchronous scheme or in an asynchronous scheme. Europe and Japan employ the asynchronous scheme, whereas the U.S. employs the synchronous scheme. Therefore, different standardization works are under way in the U.S. and Europe. The European future mobile communication system is UMTS (Universal Mobile Telecommunication Systems) or W-CDMA (Wideband Code Division Multiple Access).

A variety of regulations should be defined for multimedia services, besides voice call services, in the on-going standardization work for the future mobile communication system. Among them, an efficient call admission scheme is a major issue.

In general, the CDMA mobile communication system has limited radio resources available for a UTRAN (UMTS Terrestrial Access Network) to assign to UEs (Unit Equipments). To properly assign the limited resources for traffic generated from the UEs, a call admission method should be exploited.

The W-CDMA mobile communication system can afford to provide multimedia services efficiently that support QoS (Quality of Service) for each transport channel. However, it cannot implement a reliable call control for unexpectedly generated traffic. The unexpected traffic includes a frequent handoff and a call setup request for a special use from a UE. Moreover, an efficient, immediate call process cannot be provided when overload is imposed on the UTRAN due to excessive call processing requests.

This situation impedes implementation of fast and reliable services in the W-CDMA mobile communication system. What is worse, the ever-increasing packet data service makes it more difficult to ensure QoS through call admission control and efficient bandwidth management.

Accordingly, there is a pressing need for a call admission control which considers the characteristics of a requested call and the service class of a subscriber terminal. For this purpose, a novel RRC (Radio Resource Control) message and its related operation must be offered.

SUMMARY OF THE INVENTION

It is, therefore, an object of the present invention to provide a call processing method which ensures QoS by efficient call admission in a CDMA mobile communication system.

It is another object of the present invention to provide a call admission method at an RRC layer to ensure QoS in a CDMA mobile communication system.

It is a further object of the present invention to provide a novel RRC message that ensures QoS in a CDMA mobile communication system.

The foregoing and other objects of the present invention are achieved by providing a call admission method in a CDMA mobile communication system. To admit calls from a plurality of UEs (Unit Equipments) within a cell with limited radio resources, a UTRAN temporarily releases radio resources assigned to at least one call being serviced with a service level lower than a new call from a UE if the new call cannot be admitted with available radio resources. Then, the UTRAN assigns radio resources to admit the new call with the available radio resources and the released radio resources.

If a UE receives a waiting message requesting the UE to hold its service during the service in progress, the UE releases the assigned radio resources at an action time set in the waiting message and holds the service temporarily. Upon receipt of a reconnect message requesting the UE to resume the held service from the UTRAN, the UE is assigned to the radio resources from the UTRAN at an action time set in the reconnect message and resumes the held service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Radio resources used hereinafter refer to radio channels that a UTRAN can assign to UEs for wireless communication. That is, the radio resources can be radio channels or frequency bandwidth available to the UTRAN.

Figure 1:
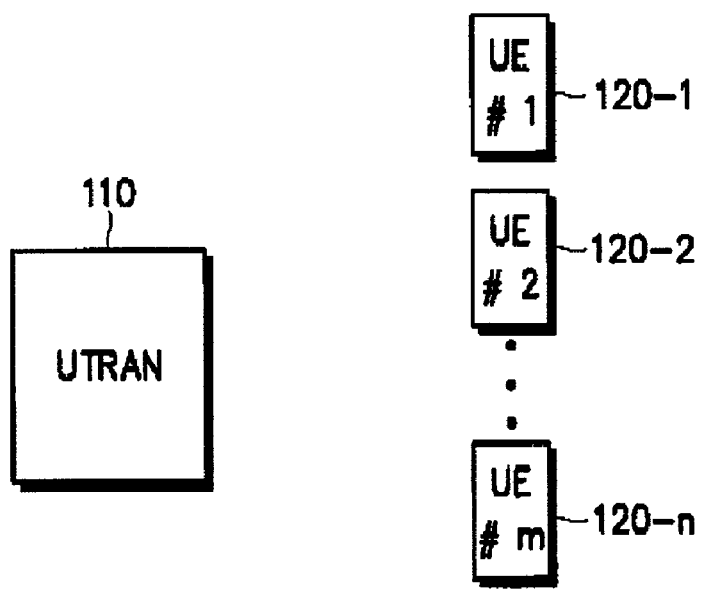
FIG. 1 is a schematic view of a CDMA mobile communication system to which the present invention is applied.

FIG. 1 is a schematic view of a CDMA mobile communication system to which the present invention is applied.

Referring to FIG. 1, a UTRAN 110 manages radio resources to provide services requested by UEs 120-1 to 120-n (hereinafter, 120). The UTRAN 110 also acknowledges a call connection request and sets up a call by negotiation in which radio resources are assigned according to the characteristic of the requested call. The call connection and bandwidth assignment to ensure QoS occur within limited radio resources.

Figure 2:
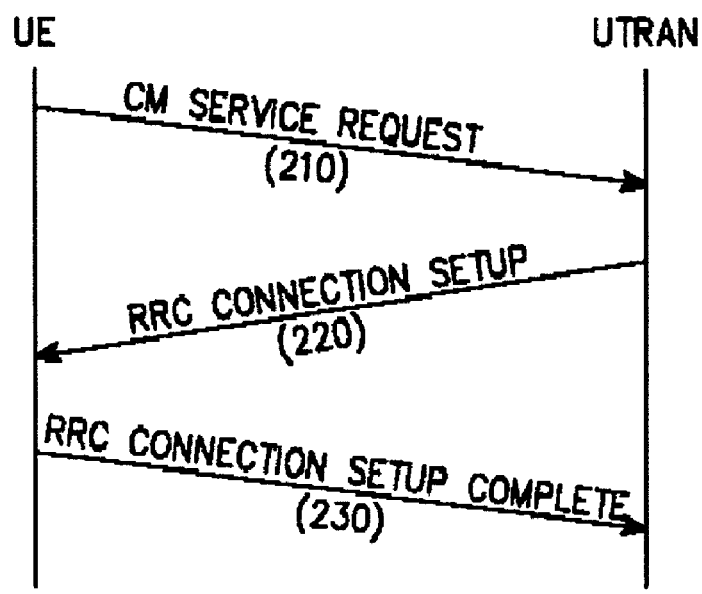
FIG. 2 is a diagram showing transmission of messages between a UTRAN and a UE during call setup according to an embodiment of the present invention.

FIG. 2 is a signal flow diagram illustrating exchange of messages between the UTRAN 110 and a UE 120 for a call setup according to an embodiment of the present invention.

Referring to FIG. 2, for the UE 120 to request a call initially, a higher layer, i.e., an RRC layer, must transmit a CM (Call Management) service request to the UTRAN 110. That is, the UE 120 transmits an RRC connection request message to the UTRAN 110 in an idle state to request a call setup in step 210. Because a traffic channel, that is, a dedicated channel is not connected between the UE 120 and the UTRAN 110, the UE 120 transmits the RRC connection request message on a random access channel (RACH) or a common control channel (CCCH). In step 220, the UTRAN 110 transmits an RRC connection setup message in response to the RRC connection request message. Upon receipt of the RRC connection setup message, the UE 120 transitions from the idle state to a UTRAN connected state. Then, the UE 120 transmits an RRC connection setup complete message in step 230. Hence, the pending CM service request is transmitted by an initial direct transfer message and the call setup is completed.

Figure 3:
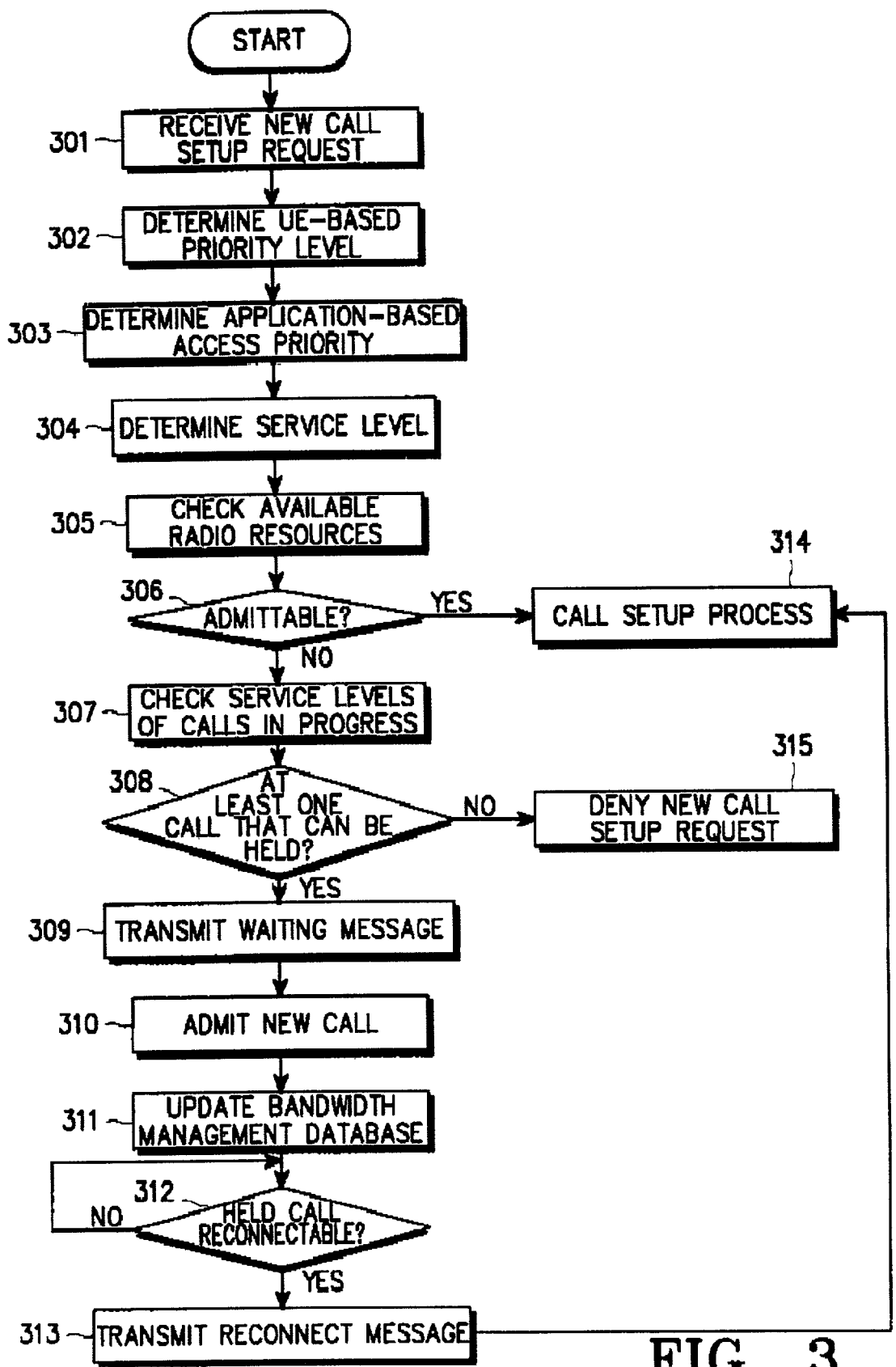
FIG. 3 is a flowchart illustrating a control operation for call admission in the UTRAN in a CDMA mobile communication system according to the embodiment of the present invention.

FIG. 3 is a flowchart illustrating a UTRAN operation for acknowledging a call connection request during the above-described call setup, that is, a control operation for call admission in the UTRAN in a CDMA mobile communication system according to the embodiment of the present invention. According to the procedure of FIG. 3, the UTRAN checks radio resources in use and available radio resources, compares the available radio resources with radio resources required for a requested call, and acknowledges the new call setup, holding a call being serviced according to the comparison result.

To perform the procedure shown in FIG. 3, an RRC message (waiting message) for holding a UE from being serviced and another RRC message (reconnect message) indicating resumption of the held service should be configured.

Upon receipt of an RRC waiting message, the UE discontinues data transmission. Since the UE has not released RRC connection, it can still be in a UTRAN connected state. If the UE maintains a traffic channel, it can be in a CELL_DCH state. A transport channel reconfiguration message can be used as the RRC waiting message in this RRC state. Or a new message may be defined to transmit a waiting command to the UE as long as it includes common information elements required to instruct the UE to wait.

Upon receipt of the RRC reconnect message, the UE can resume the discontinued data transmission. In resuming the data transmission, the UE can utilize the same physical channel layer-related parameters, service options, and associated RAB (Radio Access Bearer) parameters as set when receiving the RRC waiting message. The RRC reconnect message may be a transport channel reconfiguration message or may be defined as a new message as long as it includes common information elements required to instruct the UE to reconnect.

Figure 4:
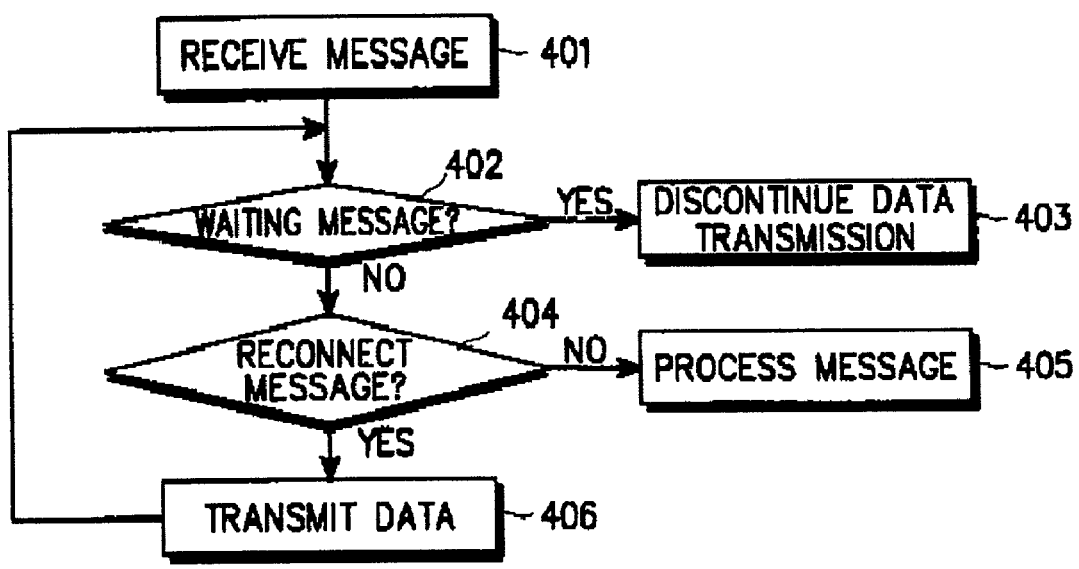
FIG. 4 is a flowchart illustrating a control operation for call admission in the UE in the CDMA mobile communication system according to the embodiment of the present invention.

FIG. 4 is a flowchart illustrating a control operation for service holding or service reconnection for call admission in the UE of the CDMA mobile communication system according to the embodiment of the present invention.

The procedure of FIG. 4 includes the steps of processing an RRC waiting message indicating temporal discontinuation of data transmission upon receipt of the RRC waiting message during a service in progress and processing an RRC reconnect message upon receipt of the RRC reconnect message in the service holding state.

If the UE receives the RRC waiting message during a service in progress, it discontinues data transmission/reception and enters a holding state. In the holding state, the UE is not allowed to transmit a reconnection request message until it receives an RRC reconnect message. To receive the RRC reconnect message, the UE should be in the CELL_DCH state of the UTRAN connected state. If the UE was transitioned to a state without a dedicated channel, the RRC state of the UE can be a CELL_FACH state. Since the UE can monitor a scheduled common channel FACH in the CELL_FACH state, it can receive the RRC reconnect message from the UTRAN.

The call admission method of the present invention will now be described in detail referring to FIGS. 3 and 4.

In FIG. 3, the UTRAN 110 checks whether a call setup request has been received from a new UE 120 in step 301. The call setup request is issued by an RRC connection request message on an RACH or a CCCH. Since it does not know accurately radio resources available to the UTRAN 110, the UE 120 requests radio resource requirements for data traffic to be transmitted by the RRC connection request message.

In step 302, the UTRAN 110 judges the priority level of the UE 120 by determining whether the UE 120 is at a premium level offering a special service or a relatively high quality service or at an emergency state for an emergency call and then determines a service priority for the UE 120. Here, the UE-based priority level is determined regardless of the class of a requested service and requested service options. The UE-based priority level can be set using a predetermined access class (AC) for the UE or notified to the UTRAN by the RRC connection request.

In step 303, the UTRAN 110 determines an application-based access priority for the UE 120. Application services are divided largely into a voice service and a packet data service. The packet data services are in turn divided into a high data rate packet data service, a picture service, or a packetized voice service. The application-based access priority depends on the characteristic of a requested application service, regardless of the characteristic of the UE 120.

In step 304, the UTRAN 110 determines a final service level taking the UE-based priority level and the application-based access priority level into account, referring to a service level database. While the UTRAN 110 may set service level criteria in many ways, the UE characteristic and the application service quality must be considered to efficiently control QoS. Particularly, to efficiently assign and manage bandwidth serviced by the UTRAN 110, a service level must be determined after taking the above characteristics into full consideration.

The UTRAN 110 calculates radio resources required to satisfy the determined service level and checks the volume of available radio resources in step 305.

In step 306, the UTRAN 110 determines whether to acknowledge or deny the call setup request based on the volume of the available radio resources. If the available radio resources are enough to satisfy the service level, the UTRAN 110 acknowledges the call setup request. Then, the UTRAN 110 goes to step 314 and performs a call setup.

On the other hand, if the UTRAN 110 determines that the call setup request is to be denied in step 306, it considers the determination again based on the service level determined in step 304.

In step 307, the UTRAN 110 checks the service levels of calls being serviced within the UTRAN 110. The service levels of the calls in progress were also determined in the same manner in steps 301 to 304.

The UTRAN 110 determines whether there exists a call that is being serviced but can be held, by comparing the service levels of the calls being serviced with that of the requested call in step 308. A service can be held if it has a lower service level than the requested call.

If the service levels of the calls being serviced are higher than the service level of the requested call, the UTRAN 110 denies the call setup request in step 315.

If the service level of at least one call being serviced is lower than that of the requested call, the UTRAN 110 proceeds to step 309. If a plurality of calls being serviced have lower service levels than the requested call, the UTRAAN 110 selects one of them to be held. The prefered way of determining a call to be held is to check the number of service holdings for each of the calls and select the call with the smallest number of service holdings.

In step 309, the UTRAN 110 transmits an RRC waiting message requesting the selected UE to hold its service. As stated above, the UE receiving the RRC waiting message has a lower service level than the UE requesting the call. That is, to establish a call with a higher service level and its QoS, radio resources in use are released temporarily. The RRC waiting message has information elements shown below in Table 1. Table 1 lists information elements required to implement the present invention.

Upon receipt of the RRC waiting message, the corresponding UE holds the service temporarily according to the procedure shown in FIG. 4. The UE still maintains parameters for establishing a physical channel and service option information representing the characteristics of an application service when holding the service. The UE discontinues data transmission until it receives an RRC reconnect message indicting resumption of the call from the UTRAN 110. This will be described below with reference to FIG. 4.

In step 310, the UTRAN 110 acknowledges the call setup request by assigning the radio resources of the UE of which the service is held to the UE requesting the call. To perform step 310, the UTRAN 110 can transmit the RRC waiting message to two or more UEs. It implies that in the case where the available radio resources and radio resources secured by holding a call being serviced are not enough for the requested call, a plurality of calls being serviced can be held. Step 310 is performed in the same manner as step 314.

The UTRAN 110 updates a bandwidth management database in step 311. The UTRAN 110 resets the volume of the available radio resources, taking into account the radio resources assigned to the new call and the radio resources saved from the held call. Step 311 is essential to efficient bandwidth management along with call admission and maintenance of calls in service. While various bandwidth and database management techniques may be employed, it is important to consider the priority of the UE, the characteristic of a call (e.g., premium call, emergency call, handoff call, or reconnect call), and service characteristics including delay time and loss. Concentration of RRC waiting messages on a specific call, that is, a specific UE must be prevented. To do so, the bandwidth management database should include indexes indicating the number of occurrences of the RRC waiting messages for each UE and the UTRAN 110 should refer to the indexes in transmitting an RRC waiting message.

In step 312, the UTRAN 110 determines whether the held service can be resumed. This is possible when available radio resources are secured after an arbitrary call is released.

If the held call can be reconnected, the UTRAN 110 transmits an RRC reconnect message to the corresponding UE in step 313. Table 2 below lists information elements for the RRC reconnect message.

Now, receipt of an RRC waiting message and an RRC reconnect message and processing the messages in a UE according to the embodiment of the present invention will be described in detail with reference to FIG. 4.

In FIG. 4, the UE 120 receives a message on a dedicated channel in a traffic state, that is, during a call in progress in step 401. In step 402, the UE 120 determines whether the received message is an RRC waiting message by analyzing its message type. If the message is not an RRC waiting message, the UE 120 determines whether it is an RRC reconnect message in step 404.

If the received message is an RRC waiting message in step 402, the UE 110 goes to 403. If the received message is an RRC reconnect message in step 404, the UE 120 resumes data transmission in step 406. If the received message is not an RRC waiting message nor an RRC reconnect message in steps 402 and 404, the UE 120 processes the received message, considering that it is not related to bandwidth management and control but a typical message receivable on a traffic channel in step 405.

In step 403, the UE 120 holds the service in progress in response to the RRC waiting message. Both the UTRAN 110 and the UE 120 discontinue data transmission/reception simultaneously at an action time set in the RRC waiting message. The simultaneous discontinuation of data transmission/reception is possible only if the UTRAN 110 is synchronized to the UE 120. Without timing synchronization between them, the action time is different between the UTRAN 110 and the UE 120. This causes asynchronous discontinuation of data transmission/reception. Therefore, the UTRAN 110 transmits an SFN (System Frame Number) to the UE 120 every predetermined intervals (e.g., 10 ms) for synchronization between the UTRAN 110 and the UE 120. To rapidly reconnect the held service, the UE 120 maintains physical channel-related parameters and service options even if it discontinues data transmission. The use and fields of the RRC waiting message will be described in detail below referring to Table 1.

In step 405, the UE 120 performs an operation as indicated by the received message, considering that it is a typical message receivable on a traffic channel. On the other hand, the UE 120 resumes the held service in step 406. The UTRAN 110 and the UE 120 resume data transmission/reception simultaneously at an action time set in the RRC reconnect message as in the RRC waiting message. Assignment of radio resources will be requested to resume the held service. Therefore, the UE 120 is assigned to radio resources from the UTRAN 110 according to the maintained information, upon receipt of the RRC reconnect message. The use and fields of the RRC reconnect message will be described below in detail referring to Table 2.

As described above, the UTRAN can force the UE to hold its service in progress and to resume the held service if available radio resources are secured.

Meanwhile, the RRC waiting message and the RRC reconnect message should be defined to implement the present invention. Table 1 and Table 2 list only fields of the RRC waiting message and the RRC reconnect message required to perform the functions according to the present invention. The fields of the present invention can be inserted into a typical traffic channel message, or the function of the traffic channel message can be incorporated into the message configured according to the present invention.

TABLE 1

| Information element | Need | Multi | Type and reference | Semantic description |
|---|---|---|---|---|
| Waiting information | MP | | | |
| >Duration time | MP | | | Waiting time for packet retransmission |
| >Reason | MP | | | Waiting reason |
| >Action time | MP | | | Start time for discontinuation of packet transmission |

In Table 1, upon receipt of a message from the UTRAN 110, the UE 120 analyses Message Type (not shown) to determine what type the received message is. Here, Waiting Information is written in Message Type. General Message fields (not shown) are common to typical traffic channel messages. The General Message fields are not related directly to the present invention. Duration is a field indicating the duration time of non-data transmission in the case of an RRC waiting message. This field enables the UE 120 to resume message transmission without the need of receiving an RRC reconnect message from the UTRAN 110. Duration is added to the RRC waiting message only if Duration Flag (not shown) is set to 1. An operator sets Duration Flag to determine transmission of the RRC reconnect message. Duration can be set when the duration of a call in service can be estimated, the call is released at an expected time, and the resulting available radio resources are enough for the radio resource requirement of the UE 120 for which the held service is to be resumed. Reason notifies the UE 120 why the service is to be held. According to Reason, the UE 120 can perform an appropriate operation. Use Time (not shown) is a field indicating whether Action Time is included or not in the RRC waiting message. If Use Time is set to 1, Action Time is included and the RRC waiting message takes effect at a time set in Action Time. The use of Action Time aims at reduction of data loss during transmission/reception. The UTRAN 110 and the UE 120 discontinue data transmission/reception at an action time simultaneously. Duration Flag and Use Time can be set as separate fields in the RRC waiting message or using one bit respectively from Duration and Action Time.

TABLE 2

| Information element | Need | Multi | Type and reference | Semantic description |
|---|---|---|---|---|
| Reconnection information | MP | | | |
| >Duration time | MP | | | Waiting time for packet retransmission |
| >Action time | MP | | | Start time for retransmission |

In Table 2, upon receipt of a message from the UTRAN 110, the UE 120 analyses Message Type (not shown) to determine what type the received message is. Here, Reconnection Information is written in Message Type. General Message fields (not shown) are common to typical traffic channel messages. The General Message fields are not related directly to the present invention. Duration is a field used when the UE 120 cannot resume the data transmission even after the time set in Waiting Duration of the RRC waiting message or a time set in a previously received RRC reconnect message. If data transmission is possible to be resumed after the time set in Duration, there is no need for receiving another RRC reconnect message. Duration is added to the RRC reconnect message only if Duration Flag (not shown) is set to 1. Duration can be used when the available radio resources are enough for the radio resource requirement of the UE 120 for which the held service is to be resumed. Use Time (not shown) is a field indicating whether Action Time is included or not in the RRC reconnect message. If Use Time is set to 1, Action Time is included and the RRC reconnect message takes effect at a time set in Action Time. The use of Action Time aims at reduction of data loss during resumed data transmission/reception. The UTRAN 110 and the UE 120 resume data transmission/reception at an action time simultaneously.

In Table 2, Duration Flag and Use Time can be set as separate fields in the RRC reconnect message or using one bit respectively from Duration and Action Time.

The message structures shown in Table 1 and Table 2 are mere examples to implement the present invention. Therefore, new messages can be defined or existing messages can be utilized with the use of the information elements defined in Table 1 and Table 2.

In accordance with the present invention as described above, a new call is admitted by holding a call being serviced with a lower service level than the new call. Accordingly, radio resources are efficiently utilized and assigned.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of admitting calls from a plurality of UEs (Unit Equipments) within a cell with limited radio resources in a UTRAN (UMTS Terrestrial Radio Access Network) of a CDMA mobile communication system, comprising the steps of:

transmitting a wait message to and temporarily releasing radio resources assigned to at least one call being serviced at a UE with a service level lower than a new call from a UE if the new call cannot be admitted with available radio resources; and assigning radio resources to admit the new call with the available radio resources and the released radio resources.

2. The method of claim 1, wherein the service level of a UE is determined based on a UE-based priority level and an application-based access priority of the call.

3. The method of claim 1, wherein the available radio resources are remaining radio resources after radio resources are assigned to calls being serviced from the limited radio resources.

4. The method of claim 1, wherein the released radio resources are determined based on the available radio resources and radio resources required for admission of the new call.

5. The method of claim 1, further comprising the step of releasing radio resources assigned to a call if the call ends and assigning the released radio resources to a temporarily held call.

6. The method of claim 1, further comprising the step of denying the new call if none of the service levels of all calls in progress are lower than the service level of the new call.

7. The method of claim 1, wherein if a plurality of calls in progress have service levels lower than the new call, radio resources assigned to a call which has been held the least times among the plurality of calls are released.

8. A method of providing a service with radio resources assigned among limited radio resources managed by a UTRAN in a UE of a CDMA mobile communication system, comprising the steps of:
receiving a waiting message requesting the UE to hold the service during the service in progress;
releasing the assigned radio resources at an action time set in the waiting message and holding the service temporarily;
receiving a reconnect message requesting the UE to resume the held service from the UTRAN; and
being assigned to the radio resources from the UTRAN at an action time set in the reconnect message and resuming the held service.

9. The method of claim 8, wherein when the UE releases the assigned radio resources, the UE maintains parameters for establishing a physical channel and service options representing the characteristics of the service for fast reconnection.

10. A method of admitting a new call from a first UE in the case where the new call is to be denied due to lack of available radio resources from limited radio resources managed by a UTRAN in a CDMA mobile communication system where calls from a plurality of UEs within a cell are admitted with the limited radio resources, comprising the steps of:
requesting at least one call being serviced with a lower service level than a service level of the new call to be held temporarily by the UTRAN using a wait message transmitted to a second UE;
releasing radio resources from the requested call by the second UE corresponding to the requested call;
assigning radio resources to the new call with the released radio resources and the available radio resources by the UTRAN;
releasing radio resources from a call among calls being serviced when the call ends and assigning the released radio resources to the held call; and
admitting the held call by the second UE.

11. The method of claim 10, wherein the service level of a UE is determined based on a UE-based priority level and an application-based access priority of the call.

12. The method of claim 10, wherein the available radio resources are remaining radio resources after radio resources are assigned to calls being serviced from the limited radio resources.

13. The method of claim 10, wherein the released radio resources are determined based on the available radio resources and radio resources required for admission of the new call.

14. The method of claim 10, further comprising the step of denying the new call if none of the service levels of all calls in progress are lower than the service level of the new call.

15. The method of claim 10, wherein if a plurality of calls in progress have service levels lower than the new call, radio resources assigned to a call which has been held the least times among the plurality of calls are released.

16. A method of admitting calls from a plurality of UEs (Unit Equipments) within a cell with limited radio resources in a UTRAN (UMTS Terrestrial Radio Access Network) of a CDMA mobile communication system, comprising the steps of:
temporarily releasing radio resources assigned to at least one call being serviced with a service level lower than a new call from a UE if the new call cannot be admitted with available radio resources;
assigning radio resources to admit the new call with the available radio resources and the released radio resources; and
maintaining a parameter about the call temporarily released radio resources.

17. The method of claim 16, wherein the maintained parameter includes a service option.

* * * * *